INVENTOR
WILLIAM C. SMITH

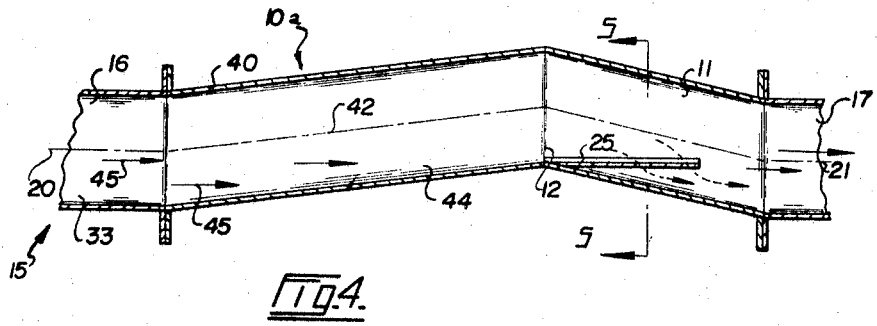
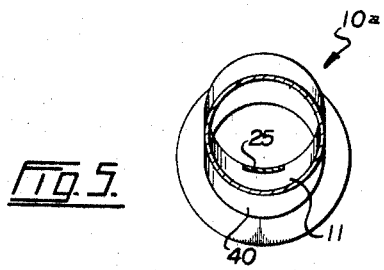
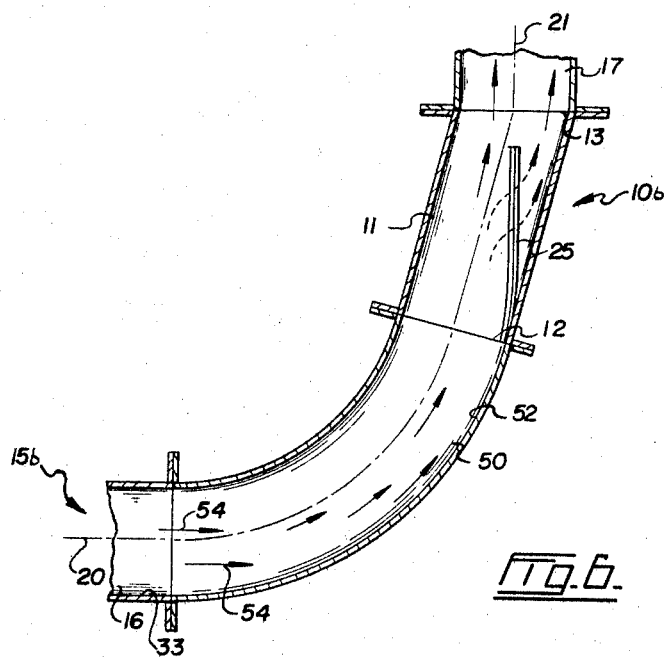

United States Patent Office 3,425,749
Patented Feb. 4, 1969

3,425,749
CONVEYOR PIPE RE-ENTRAINMENT APPARATUS
William C. Smith, West Vancouver, British Columbia, Canada, assignor to Rader Pneumatics & Engineering Co. Ltd., Burnaby, British Columbia, Canada
Filed June 29, 1966, Ser. No. 561,509
U.S. Cl. 302—64                12 Claims
Int. Cl. B65g 53/04, 53/52

ABSTRACT OF THE DISCLOSURE

Conveyor pipe apparatus including an entraining pipe section, and a guide vane mounted in and extending longitudinally of this section towards the axial centre of the downstream end of the section, said vane when conveying fluid moves particulate material through the entraining section directing particulate material from the confining wall of the section away therefrom and towards said axial centre while said confining wall directs conveying fluid around the material travelling over the vane.

---

Figure 1:
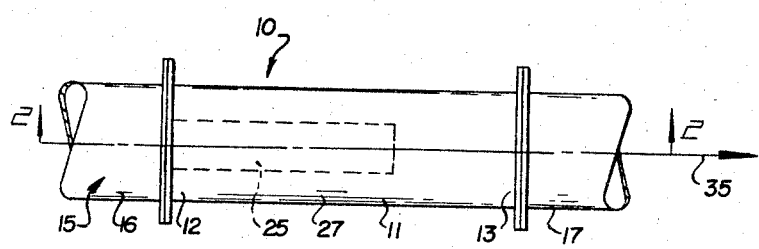

This invention relates to conveyor pipe apparatus for re-entraining particulate material being moved through the pipe by a conveying fluid.

This apparatus is particularly designed for re-entraining particulate material in a gaseous conveying fluid, such as air, but it can also be used in conveyor pipes in which liquid is the conveying medium. The term "particulate material" is intended to include any material that can be moved by a fluid medium through a conveyor pipe, such as, for example, powders, granular materials, wheat, sawdust, chips and the like.

In a fluid conveyor, a conveying medium moves particulate material over fluidizable material therethrough. Theoretically, there is a uniform mixture of the material and fluid. The successful operation or stability of the conveyor depends upon maintaining a uniform mix of the material and the conveying medium throughout the length of the system. In actual practice, this theoretical approach is very difficult to attain because the conveyed material being heavier than the conveying medium tends to settle and concentrate towards the bottom of the pipe line, and because many fittings or other necessities within the system, such as elbows and valves, cause a change of direction of the flowing fluid, and this results in further separation of the material therefrom.

Both of these problems can be minimized if the velocity of the conveying medium is kept relatively high. However, unnecessarily high velocities require more power and cause higher wear on both the conveyed material and the conveyor pipe, thereby reducing the efficiency of the fluid conveyor system.

Past efforts to solve these problems have not been very successful since they tended to create other problems. For example, baffles have been placed on the bottom surface of a conveyor pipe, these baffles directing any particulate material travelling along said bottom surfaces across the general flow of the conveying fluid. This creates undue turbulence in the conveying medium, interferes with the flow of the medium, and does not entrain all of the particulate material since the general momentum thereof is destroyed by the sudden change of direction of its movement.

The present conveyor pipe re-entrainment apparatus alleviates these problems in straight conveyor pipes and at curves formed therein. This apparatus picks up particulate material moving along or near a surface of the conveyor pipe and directs said material in an axial direction along the longitudinal axis of said conveyor pipe.

The problem is to direct the material back into the centre of the conveying medium with as little turbulence as possible through the movement of the latter. It is also necessary to get the conveying medium completely around the material as the latter is discharged back into the centre of the moving medium. The preferred apparatus is designed to keep the particulate material being re-entrained in straight-line motion and supporting said material while slightly changing the direction of movement of the conveying medium relative to this particulate material. The reason for this is that the conveying medium being less dense than the particulate material, it is easier to change the direction of flow of this medium than that of the material.

Conveyor pipe apparatus according to the present invention includes an entraining pipe section having a confining wall, an inlet end and an outlet end and adapted to be inserted in a conveyor pipe so that conveying fluid thereof moves through this section. A guide vane is mounted in the entraining section and extends from the wall thereof near its inlet end longitudinally of the section towards the axial centre of the outlet end. This guide vane is preferably transversely narrower than the entraining pipe section, and it is preferable to transversely shape this vane to correspond with the cross sectional curve of the entraining section. When conveying fluid moves particulate material through the entraining section, the vane directs particulate material from the confining wall of the entraining section towards the axial centre of the section outlet end, while the wall of the section directs conveying fluid around the material travelling over the vane.

The invention also contemplates a conveyor pipe incorporating the above-mentioned entraining section with the guide vane therein.

Figure 2:
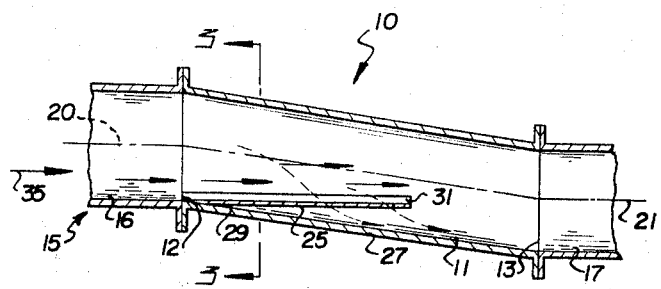
Figure 3:
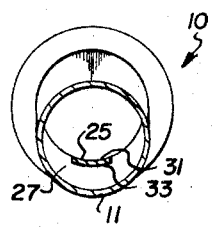

Examples of this invention are illustrated in the accompanying drawings, in which:

FIGURE 1 is a plan view of one form of conveyor pipe re-entrainment apparatus according to this invention, FIGURE 2 is a longitudinal section taken on the line 2—2 of FIGURE 1, FIGURE 3 is a cross section taken on the line 3—3 of FIGURE 2, FIGURE 4 is a view similar to FIGURE 2 of an alternative form of re-entrainment apparatus, FIGURE 5 is a cross section taken on the line 5—5 of FIGURE 4, and FIGURE 6 is a view similar to FIGURE 2 of another alternative form of re-entrainment apparatus.

Referring to FIGURES 1 to 3 of the drawings, 10 is one form of conveyor pipe re-entrainment apparatus comprising an entraining pipe section 11 having an inlet end 12 and an outlet end 13. The entrainment section forms part of a conveyor pipe 15 having a portion 16 extending and connected to the inlet end 12 of said section, and another portion 17 connected to outlet end 13 and extending away therefrom. In this form of the invention, the longitudinal centre lines 20 and 21 of pipe portions 16 and 17 are parallel but offset relative to each other, as clearly shown in FIGURE 2. Entraining section 11 is inclined from pipe portion 16 to pipe portion 17. Although not absolutely necessary, it is preferable that centre line 21 of portion 17 be offset a distance equal to about half the diameter of conveyor pipe 15 from centre line 20.

A guide vane 25 is mounted in entraining section 11 and extends from the wall 27 of said section near the inlet end 12 longitudinally of the section towards the axial centre of outlet end 13, said centre coinciding with the longitudinal axis of pipe portion 17. The confining wall 27 of section 11 is preferably of tubular formation, and vane 25 is preferably shaped in a transverse direction so that its end 29 near inlet end 12 fits the curve of section wall 27. This transverse curve of the vane is shown at 31 in FIGURE 3. It will be noted that vane 25 extends straight on from the lower surface 33 of conveyor pipe portion 16.

As particulate material is moved through conveyor pipe 15 in the direction of arrow 35, shown in FIGURE 1, by a conveyor medium, such as air, there is a tendency for the particulate material to settle to the bottom surface of the conveyor pipe. With this arrangement any particulate material moving along or near bottom surface 33 of pipe portion 15 travels onto and along vane 25 in entrainment section 11. The material maintains substantially its straight-line movement, and is directed into conveyor pipe portion 17 along the central axis 21 thereof. The direction of flow of the conveying fluid and any particulate suspended therein is changed when said fluid enters section 11 by the confining wall 27 of said section, and this directs the fluid around vane 25 towards the end thereof near the section outlet end 13. It will be noted that the particulate material is supported by the vane at the time the direction of the fluid is changed so that the material is not affected by this change. From FIGURE 3 it will be seen that guide vane 25 is narrower than section 11 so that the fluid can flow completely around said vane. Thus, when the fluid and particulate material enter conveyor pipe portion 17 at the down-stream end of the entrainment section, the particulate material is travelling mainly along the longitudinal centre of the pipe where the velocity of the conveying fluid is greatest. The particulate material that has entered section 11 from bottom surface 33 of the conveyor pipe is kept in straight-line movement and is directed into the centre of pipe portion 17, while the direction of movement of the conveying fluid is changed slightly so as to cause the latter to surround the particulate material on and leaving the guide vane.

Apparatus 10 is suitable when the circumstances permit portion 17 of the conveyor pipe to be offset relative to portion 16 thereof. The alternative apparatus 10a of FIGURES 4 and 5 is used when the axes of portions 16 and 17 of conveyor pipe 15 have to be kept in alignment. In this example, a lead-in pipe section 40 is provided between the entrance end 12 of entraining pipe section 11 and the portion 16 of conveyor pipe 15. Pipe section 40 is inclined a little relative to pipe portion 16 so that the longitudinal centre line 42 of said pipe section is inclined relative to centre line 20 of portion 16. Entrainment section 11, which is connected to lead-in pipe 40 is inclined relative to the latter so that it extends to conveyor pipe portion 17 which is aligned with pipe portion 16. Guide vane 25 still extends approximately parallel to the longitudinal axes 20 and 21 of pipe portions 16 and 17, although it is inclined a little relative to bottom surface 44 of pipe 40.

Apparatus 10a is not quite as good as apparatus 10 since the incline of lead-in pipe 40 tends to cause particulate material to settle on the lower surface 44 thereof, as indicated by arrows 45 in FIGURE 4. However, any particulate material moving along or near lower surface 33 of pipe portion 17 travels along or near lower surface 44 of lead-in pipe 40 and on the guide vane 25. This vane supports the particulate material and directs it towards the longitudinal centre of conveyor pipe portion 17. The direction of movement of the conveying medium is changed once in lead-in pipe 40 and again in entrainment section 11, but in the latter, the fluid is directed around vane 25 and the particulate material thereon and being discharged therefrom.

FIGURE 6 illustrates another alternative form of re-entrainment apparatus 10b which is incorporated in a conveyor pipe 15b having its portions 16 and 17 extending at an angle to each other. In this example, a lead-in curved pipe or elbow 50 extends between and is connected to pipe portion 17 and the entrance end 12 of entrainment section 11. This entrainment section extends from elbow 50 to coveyor pipe portion 17, and the curve of elbow 50 realtive to the angular positions of pipe portions 16 and 17 is such that section 11 is inclined relative to the longitudinal axis 21 of pipe portion 17 the same as in apparatus 10 and 10a. Elbow 50 has an outer surface 52 against which particulate material from pipe portion 16 is directed, as indicated by arrows 54. Guide vane 25 in section 11 extends from near the entrance end 12 of said section and the outer surface 52 of elbow 50, which is considered the outer surface of said elbow, towards the axial centre of outlet end 13 of the entraining section and the longitudinal axis 21 of pipe portion 17.

During operation, any particulate material travelling along or near surface 33 of conveyor pipe portion 16, and along the outer surface 52 of elbow 50 also travels over and is supported by guide vane 25 which directs said material into conveyor pipe portion 17 along the longitudinal axis thereof.

In each of the illustrated forms of re-entrainment apparatus according to this invention the particulate material which has settled to the bottom of the conveyor pipe is directed in a substantially straight line to the longitudinal centre of the conveyor pipe, while the direction of movement of the conveyor medium is changed and directed around this particulate material as it reaches said longitudinal centre.

What I claim as my invention is:

1. Conveyor pipe apparatus for re-entraining particulate material being moved through the pipe by a conveying fluid, comprising an entraining pipe section having a confining wall, an inlet end and an outlet end and adapted to be inserted in a conveyor pipe so that conveying fluid thereof moves through said section, said conveyor pipe including a lead-in pipe connected to the inlet end of the entraining section, and a guide vane mounted in the entraining section and extending from said wall near said inlet end longitudinally of said section and away from the confining wall and towards the axial centre of the outlet end, said guide vane extending substantially parallel to the longitudinal axis of the lead-in pipe, and said entraining section being longitudinally inclined relative to the vane and the lead-in pipe, said vane when conveying fluid moves particulate material through the entraining section directing particulate material from the confining wall away therefrom and towards the axial centre of the outlet end while said wall of the inclined section directs conveying fluid around the material travelling over and supported by the vane.

2. Conveyor pipe line apparatus as claimed in claim 1 in which the guide vane is transversely narrower than the entraining pipe section.

3. Conveyor pipe line apparatus as claimed in claim 2 in which the confining wall of the entraining section is substantially of tubular shape, and the guide vane is transversely curved to correspond with the cross sectional curve of said entraining section.

4. Conveyor pipe apparatus for re-entraining particulate material being moved through the pipe by a conveying fluid, comprising an entraining pipe section having a confining wall, an inlet end and an outlet end and adapted to be inserted in a conveyor pipe so that the conveying fluid thereof moves through said section, and a guide vane mounted in the entraining section extending generally longitudinally thereof, said guide vane extending from a surface of the entraining section substantially aligned with a surface of the conveyor pipe to substantially the axial centre of said section near the outlet end thereof, said guide vane being shaped to gather at the inlet end of the section particulate material moving along said surface of said conveyor pipe and to direct said gathered material into the conveying fluid moving through the section at substantially said axial centre and in the direction of said outlet end and the general flow of the fluid, said guide vane being shaped to permit fluid to flow completely around said vane towards said outlet end.

5. Conveyor pipe line apparatus as claimed in claim 4 in which the guide vane is open throughout the length thereof so that particulate material moving along the vane is exposed to the fluid moving through the entraining section.

6. Conveyor pipe apparatus comprising a conveyor pipe through which particulate material is moved by a conveying fluid, an entraining pipe section positioned in said conveyor pipe and having an inlet end and an outlet end respectively connected to first and second portions of said conveyor pipe extending to and away from said section, and a guide vane mounted in the entraining section and extending from a confining wall thereof near said inlet end longitudinally of said section and away from the confining wall and towards the axial centre of the outlet end, said guide vane extending substantially parallel to the longitudinal axis of said first portion of the conveyor pipe, said section being longitudinally inclined relative to the vane, said vane when conveying fluid moves paticulate material through the entraining section directing particulate material from the confining wall away therefrom and towards the axial centre of the outlet end while said wall of the inclined section directs conveying fluid around the material travelling over and supported by the vane.

7. Conveyor pipe line apparatus as claimed in claim 6 in which the guide vane is transversely narrower than the entraining pipe section.

8. Conveyor pipe line apparatus as claimed in claim 7 in which the confining wall of the entraining section is substantially of tubular shape, and the guide vane is transversely curved to correspond with the cross sectional curve of said entraining section.

9. Conveyor pipe apparatus comprising a conveyor pipe through which particulate material is moved by a conveying fluid, an entraining pipe section positioned in said conveyor pipe and having an inlet end and an outlet end respectively connected to first and second portions of said conveyor pipe extending to and away from said section, the longitudinal axes of said first and second portions being substantially parallel and being offset radially relative to each other a distance about equal to the radius of said conveyor pipe, and a guide vane mounted in the entraining section and extending from a confining wall thereof near said inlet end and longitudinally of said section and away from the confining wall and towards the axial centre of the outlet end, said guide vane extending substantially parallel to the longitudinal axis of said first pipe portion said entraining section being longitudinally inclined from the first pipe portion to said second pipe portion, said vane when conveying fluid moves particulate material through the entraining section directing particulate material from the confining wall away therefrom and towards the axial centre of the outlet end while said wall of the inclined section directs conveying fluid around the material travelling over and supported by the vane.

10. Conveyor pipe apparatus comprising a conveyor pipe through which particulate material is moved by a conveying fluid, an entraining pipe section positioned in said conveyor pipe and having an inlet end and an outlet end respectively connected to first and second portions of said conveyor pipe extending to and away from said section, the general longitudinal axes of said first and second portions being substantially aligned, said first portion including a lead-in pipe inclined relative to the general longitudinal axis of said first portion and connection to the inlet end of the entraining section, and a guide vane mounted in the entraining section and extending from a confining wall thereof near said inlet end longitudinally of said section and away from the confining wall and towards the axial centre of the outlet end, said vane extending substantially parallel to the longitudinal axis of said lead-in pipe, said entraining section being longitudinally inclined relative to the vane and the lead-in pipe and towards said second portion of the conveyor pipe, said vane when conveying fluid moves particulate material through the entraining section directing particulate material from the confining wall away therefrom and towards the axial centre of the outlet end while said wall of the inclined section directs conveying fluid around the material travelling over and supported by the vane.

11. Conveyor pipe apparatus comprising a conveyor pipe through which particulate material is moved by a conveying fluid, an entraining pipe section positioned in said conveyor pipe and having an inlet end and an outlet end respectively connected to first and second portions of said conveyor pipe extending to and away from said section, the general axes of said first and second portions extending at an angle to each other, said first portion including an elbow curved towards said second portion and connected to the inlet end of the entraining section, said section extending from the elbow to the second portion of the conveyor being inclined relative to the longitudinal axis of said second section, and a guide vane mounted in the entraining section and extending from a confining wall thereof near said inlet end longitudinally of said section and away from the confining wall and towards the axial centre of the outlet end, said vane when conveying fluid moves particulate material through the entraining section directing particulate material from the confining wall away therefrom and towards the axial centre of the outlet end while said wall of the inclined section directs conveying fluid around the material travelling over and supported by the vane.

12. The method of re-entraining particulate material being moved through a conveyor pipe by a conveying fluid, which comprises angularly changing the direction of movement of the conveying fluid slightly relative to the general longitudinal axis of the conveyor pipe along a section of the latter while simultaneously guiding particulate material moving near the confining wall of the conveyor pipe substantially parallel to said axis through part of said pipe section to discharge said guided material along the axis.

References Cited
UNITED STATES PATENTS 2,834,059  5/1958  Hoelzel _____ 302—64
3,337,273  8/1967  Farnworth _____ 302—64

FOREIGN PATENTS 1,152,951  8/1963  Germany.

ANDRES H. NIELSEN, Primary Examiner.

U.S. Cl. X.R.

302—66